US009333639B2

(12) United States Patent
Thresher

(10) Patent No.: US 9,333,639 B2
(45) Date of Patent: May 10, 2016

(54) TWO HANDLED SHOVEL

(71) Applicant: Ralph Thresher, Westfield, MA (US)

(72) Inventor: Ralph Thresher, Westfield, MA (US)

(73) Assignee: ERGIESHOVEL, LLC, Westfield, MA (US)

(*) Notice: Subject to any disclaimer, the term of this patent is extended or adjusted under 35 U.S.C. 154(b) by 0 days.

(21) Appl. No.: 14/510,779

(22) Filed: Oct. 9, 2014

(65) Prior Publication Data

US 2015/0201542 A1 Jul. 23, 2015

Related U.S. Application Data

(60) Provisional application No. 61/864,327, filed on Aug. 9, 2013.

(51) Int. Cl.

| | |
|---|---|
| ***A01B 1/02*** | (2006.01) |
| ***A01B 1/22*** | (2006.01) |
| ***B25G 1/06*** | (2006.01) |
| ***E01H 5/02*** | (2006.01) |
| ***B25G 1/10*** | (2006.01) |

(52) U.S. Cl.
CPC *B25G 1/06* (2013.01); *B25G 1/102* (2013.01); *E01H 5/02* (2013.01); *Y10T 16/4713* (2015.01)

(58) Field of Classification Search
CPC .............. B25G 3/02; B25G 1/02; B25G 1/06; E01H 5/02; A01B 1/026; B25F 5/026; Y10T 16/4713
See application file for complete search history.

(56) References Cited

U.S. PATENT DOCUMENTS

| | | | | | |
|---|---|---|---|---|---|
| 344,890 | A | | 7/1886 | Wilson et al. | |
| 715,056 | A | | 12/1902 | Gruner | |
| 933,647 | A | * | 9/1909 | Hunt | 294/58 |
| 1,083,054 | A | * | 12/1913 | Brown | B25G 1/00 15/246 |
| 1,456,879 | A | | 5/1923 | Newman | |
| 2,470,217 | A | * | 5/1949 | McLoughlin | 37/434 |
| 2,531,227 | A | * | 11/1950 | Lubins | 294/58 |
| 3,048,387 | A | * | 8/1962 | Waggoner | 269/51 |
| 3,155,414 | A | | 11/1964 | Bales | |
| 4,050,728 | A | * | 9/1977 | Davidson | 294/58 |
| 4,155,582 | A | * | 5/1979 | Reisner | 294/58 |
| 4,690,447 | A | | 9/1987 | Adams | |
| 4,787,661 | A | | 11/1988 | Rutledge | |
| 5,133,582 | A | | 7/1992 | Rocha | |
| D347,986 | S | * | 6/1994 | Booth | D8/107 |
| 5,411,305 | A | | 5/1995 | Revoldt | |
| 5,431,468 | A | | 7/1995 | Rosenshine | |
| 5,447,349 | A | | 9/1995 | Coble | |
| 5,487,577 | A | * | 1/1996 | Ball | 294/58 |

(Continued)

FOREIGN PATENT DOCUMENTS

| | | | |
|---|---|---|---|
| CA | 2275039 | C | 7/2000 |
| CA | 2435638 | A1 | 1/2005 |
| WO | W003037061 | A1 | 5/2003 |

*Primary Examiner* — Stephen Vu
(74) *Attorney, Agent, or Firm* — Grogan, Tuccillo & Vanderleeden, LLP

(57) ABSTRACT

A dual handled utility apparatus, such as a shovel, is provided. The utility apparatus includes an elongated shaft having a first end and a second end. A first handle is affixed to the first end, and a utility head is affixed to the second end. The present invention further includes a secondary shaft. The secondary shaft includes a first end and a second end. The second end of the secondary shaft is affixed to the elongated shaft in about the middle between the first end and the second end of the elongated shaft. A second handle may be affixed to the first end of the secondary shaft.

16 Claims, 4 Drawing Sheets

(56) References Cited

U.S. PATENT DOCUMENTS

| | | | | |
|---|---|---|---|---|
| 5,499,852 | A | 3/1996 | Seigendall | |
| 5,669,650 | A * | 9/1997 | Rutz | A01B 1/026 16/426 |
| 5,704,672 | A | 1/1998 | Sims | |
| 5,921,600 | A | 7/1999 | Lucas | |
| D436,506 | S * | 1/2001 | Crowe, Jr. | 294/58 |
| D441,623 | S | 5/2001 | Storlie | |
| 6,343,822 | B1 * | 2/2002 | Badura | A01B 1/026 16/426 |
| 6,485,076 | B1 | 11/2002 | Chang | |
| 6,830,271 | B2 * | 12/2004 | Piscopo et al. | 294/58 |
| 7,300,081 | B1 | 11/2007 | Murray et al. | |
| D593,821 | S | 6/2009 | Kopp et al. | |
| 7,699,368 | B2 * | 4/2010 | Nicol | A62C 33/00 280/47.3 |
| 7,971,914 | B1 | 7/2011 | Pladson | |
| 8,491,024 | B2 | 7/2013 | Hayes | |
| 8,893,355 | B2 * | 11/2014 | Longley | B25G 1/00 16/426 |
| 2003/0051315 | A1 | 3/2003 | Lau | |
| 2003/0057721 | A1 * | 3/2003 | Ducklow | A01B 1/026 294/58 |
| 2003/0074765 | A1 | 4/2003 | Quimby | |
| 2004/0055099 | A1 | 3/2004 | Greenberg | |
| 2004/0196156 | A1 | 10/2004 | Wilker et al. | |
| 2004/0232715 | A1 | 11/2004 | Stuart | |
| 2006/0070265 | A1 | 4/2006 | Cohen | |
| 2008/0054660 | A1 | 3/2008 | Wensman | |
| 2008/0196205 | A1 | 8/2008 | Hixon | |
| 2008/0315602 | A1 | 12/2008 | Chesness | |
| 2009/0184527 | A1 | 7/2009 | Marion | |
| 2011/0173778 | A1 | 7/2011 | Wales | |
| 2011/0175382 | A1 | 7/2011 | Fisher | |
| 2012/0048074 | A1 | 3/2012 | Mosher | |
| 2013/0269153 | A1 | 10/2013 | Longley et al. | |
| 2014/0132015 | A1 | 5/2014 | Stachowski | |

* cited by examiner

TWO HANDLED SHOVEL

CROSS-REFERENCE TO RELATED APPLICATION

This application claims the benefit of priority of U.S. provisional application No. 61/864,327, filed Aug. 9, 2013, the contents of which are herein incorporated by reference.

BACKGROUND OF THE INVENTION

The present invention relates to shovels and, more particularly, to a two handled shovel.

A snow shovel is a shovel designed for removing snow. Snow shovels come in several different designs, each of which is designed to move snow in a different way. Removing snow with a snow shovel has health risks, but can also have significant health benefits when the snow shovel is used correctly. Shoveling snow using a straight shaft snow shovel requires the user to bend over and lift. As the user bends over repeatedly, they typically experience back pain within a short period of time.

As can be seen, there is a need for a shovel that reduces the need to bend over to lift the snow load, thereby reducing the stress on the back.

SUMMARY OF THE INVENTION

In one aspect of the present invention, a utility apparatus comprises: an elongated shaft comprising a first end and a second end; a first handle affixed to the first end; a utility head affixed to the second end; a secondary shaft comprising a first end and a second end, wherein the second end is affixed to the elongated shaft in between the first end and the second end; and a second handle affixed to the first end of the secondary shaft.

In another aspect of the present invention, a secondary handle attachment comprises: a secondary shaft comprising a first end and a second end; a U-shaped saddle comprising an inner surface comprising a U-channel and an outer surface, wherein the second end of the secondary shaft is affixed to the outer surface of the U-bar saddle; a handle affixed to the first end of the secondary shaft; and standard hardware such as u-bolts and saddles or worm clamps configured to secure the U-bar saddle to an elongated shaft of a utility apparatus.

These and other features, aspects and advantages of the present invention will become better understood with reference to the following drawings, description and claims.

DETAILED DESCRIPTION OF THE INVENTION

Figure 1:
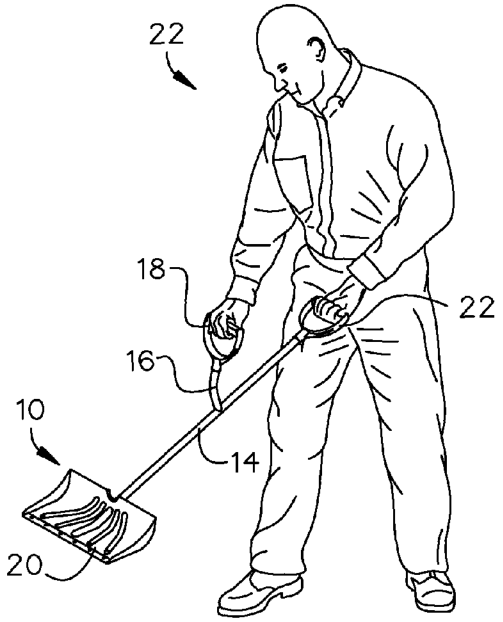
FIG. 1 is a perspective view of the present invention shown in use.
Figure 2:
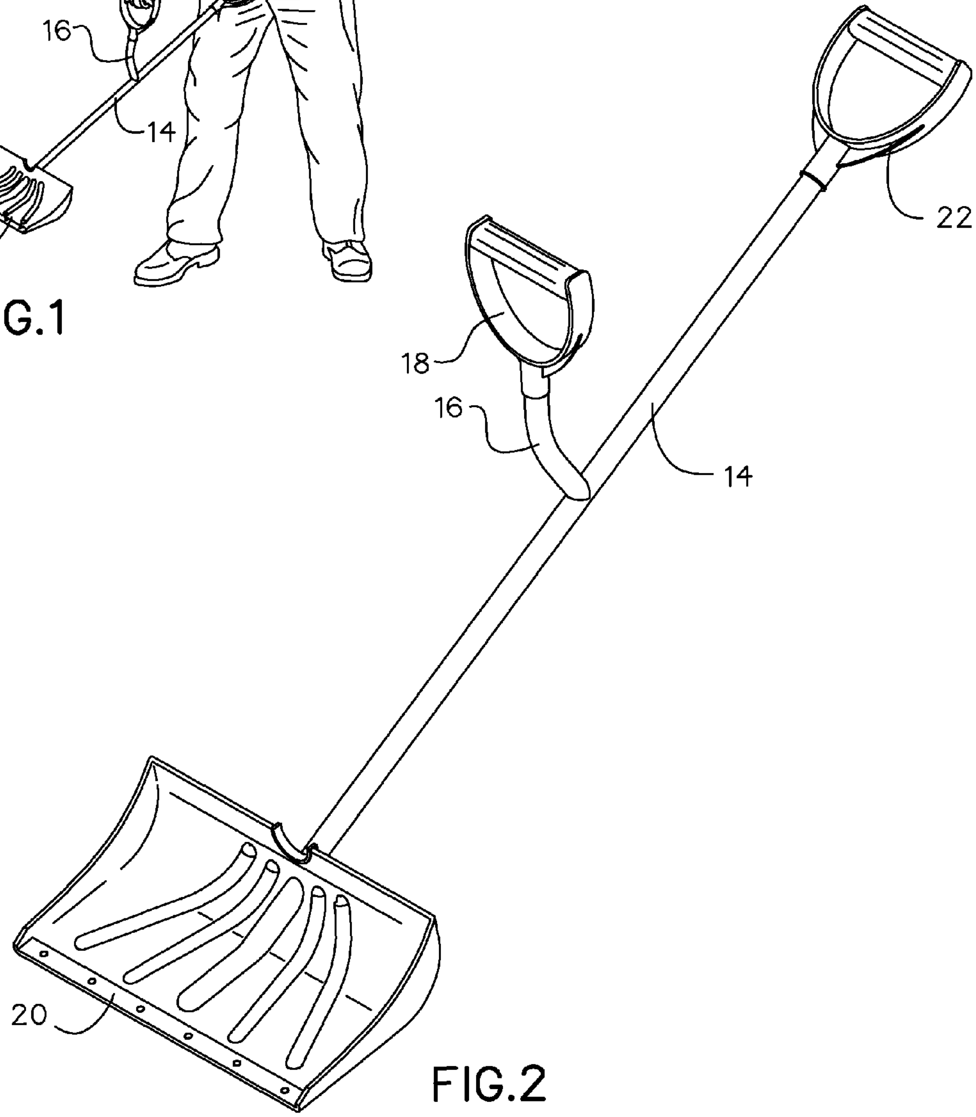
FIG. 2 is a perspective view of the present invention.
Figure 3:
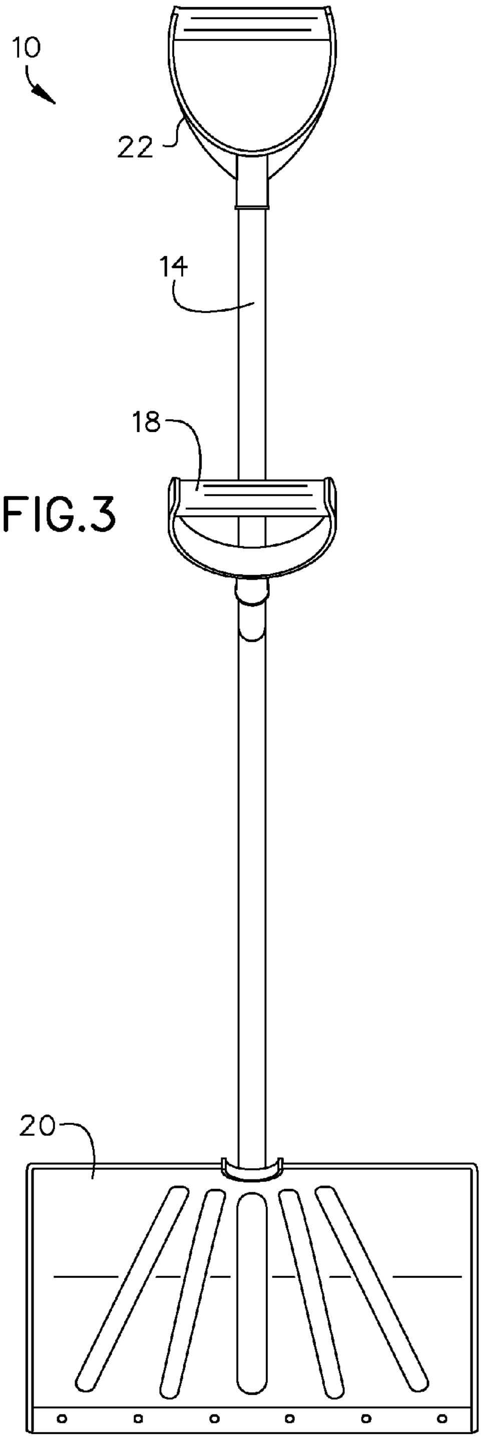
FIG. 3 is a front view of the present invention.
Figure 4:
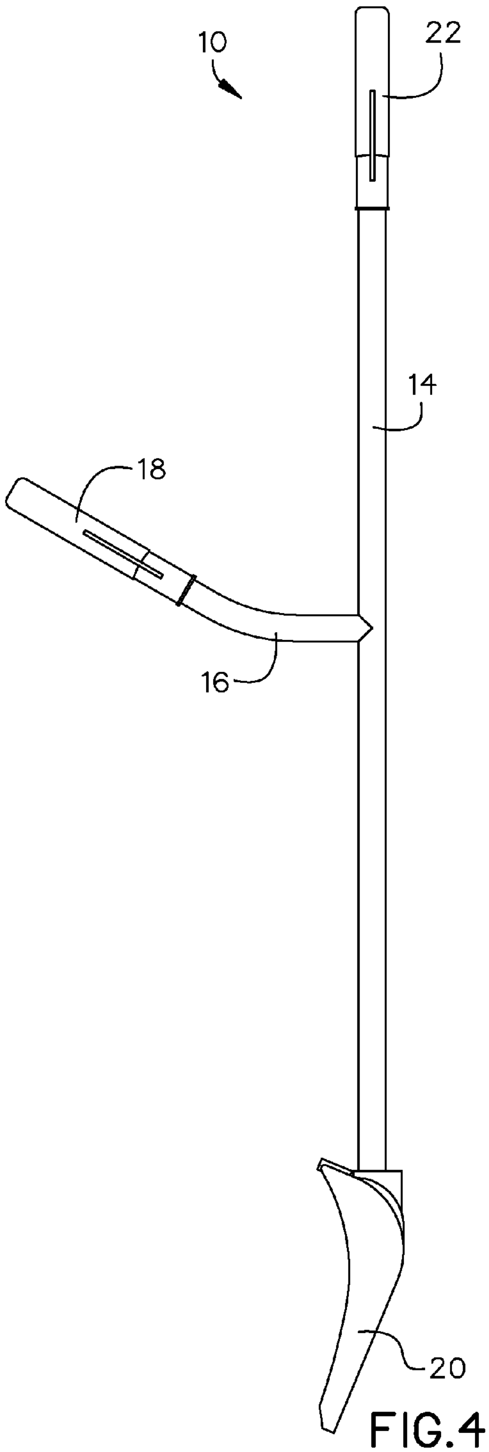
FIG. 4 is a side view of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a two handled utility apparatus, such as a two handled shovel. The present invention may utilize a straight shaft shovel with a smaller bent shaft affixed to the straight shaft at about a shoulder's width below. The shaft is bent to a comfortable, ergonomically correct angle and height so minimal to no bending is required to shovel snow. The present invention allows the user to stand upright and shovel snow. Instead of reaching down onto the elongated shaft to lift, the second D-grip handle is positioned so the user's hands are virtually parallel with one other. The present invention may also take up less space to store than the large bent shaft shovels.

Referring to FIGS. 1 through 6, the present invention includes a utility apparatus 10. The utility apparatus 10 includes an elongated shaft 14 having a first end and a second end. A first handle 12 is affixed to the first end, and a utility head 20 is affixed to the second end. The present invention further includes a secondary shaft 16. The secondary shaft 16 includes a first end and a second end. The second end of the secondary shaft 16 is affixed to the elongated shaft 14 in between the first end and the second end of the elongated shaft 14. A second handle 18 may be affixed to the first end of the secondary shaft 16.

The utility apparatus of the present invention may include a shovel, a landscaping rake, an iron gardening rake, a push broom, or other stick handle tools to reduce the amount of bending while using them. As illustrated in the Figures, the present invention may include a snow shovel. In such embodiments, the utility head 20 is a snow shovel scoop having a top surface and a bottom surface. The elongated shaft 14 may be steel tubing, typically ranging from 35-37" in length. The secondary shaft 16 may be around 10" in length, with a bend of 26-34 degrees to orient the attached handle in an ergonomically comfortable orientation when affixed perpendicular to the elongated shaft. The second handle 18 may be positioned about half way up the elongated shaft 14. Further, the secondary shaft 16 may protrude from the elongated shaft 14 on the same side as the top surface of the shovel scoop.

As illustrated in the Figures, the secondary shaft 16 may be curved. The secondary shaft 16 may curve towards the first d-grip handle with a bend that could range from 26-34 degrees. 12. In certain embodiments, the secondary shaft 16 may be curved so that the second handle 18 is oriented at an angle from about 56 degrees to about 64 degrees relative to the elongated shaft 14. In certain embodiments, the second handle 18 is oriented at an angle of about 60 degrees relative to the elongated shaft 14. The angle of the second handle 18 allows a user 22 to grip the present invention in a comfortable position.

In certain embodiments, the handles 18, 22 of the present invention may be D-shaped handles. However, the handles 18, 22 may be in any form, such as T-shaped handles and the like. Further, the handles 18, 22 may include finger grips as well as padding.

Figure 5:
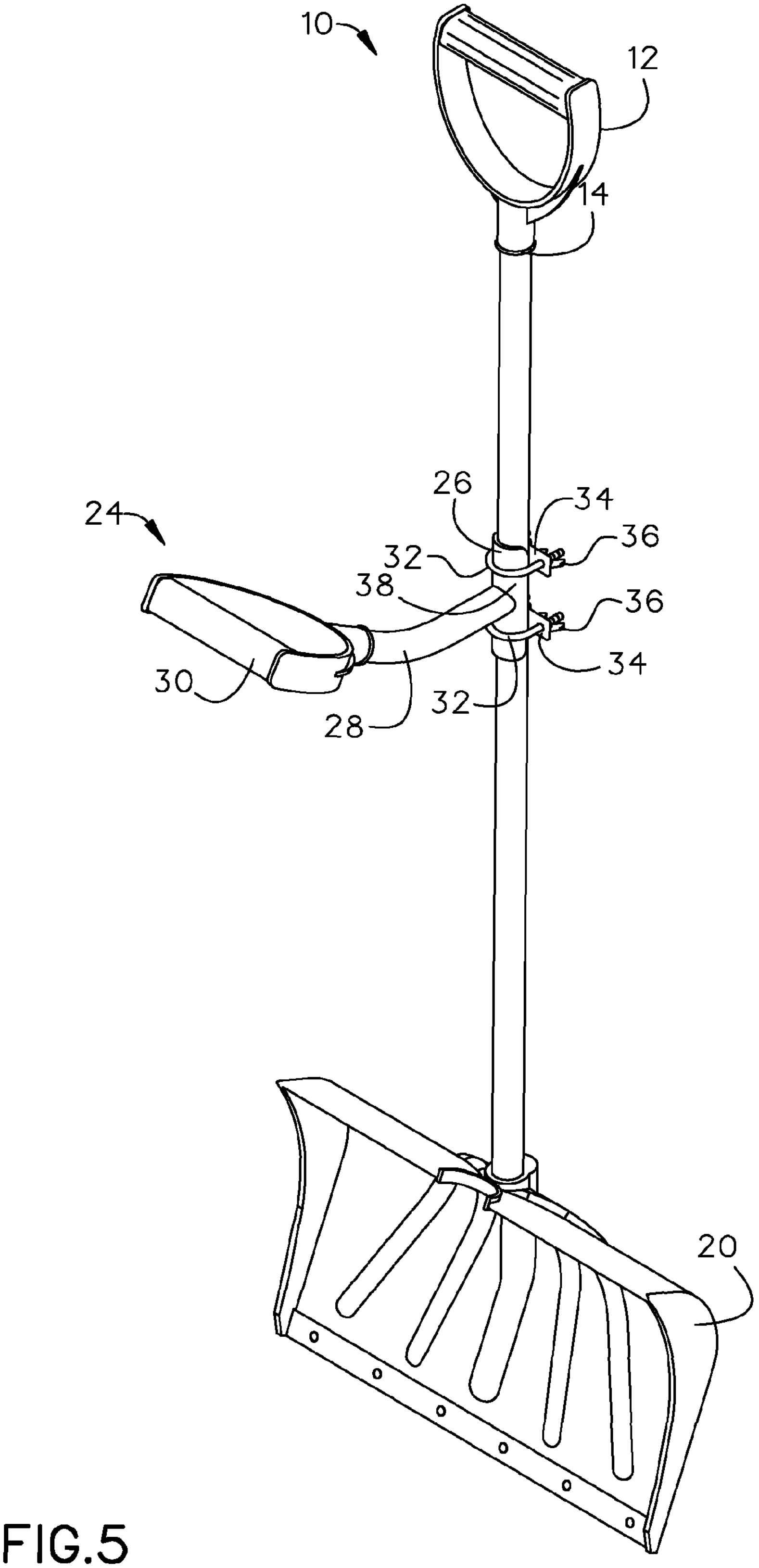
FIG. 5 is a perspective view of an alternate embodiment of the present invention.
Figure 6:
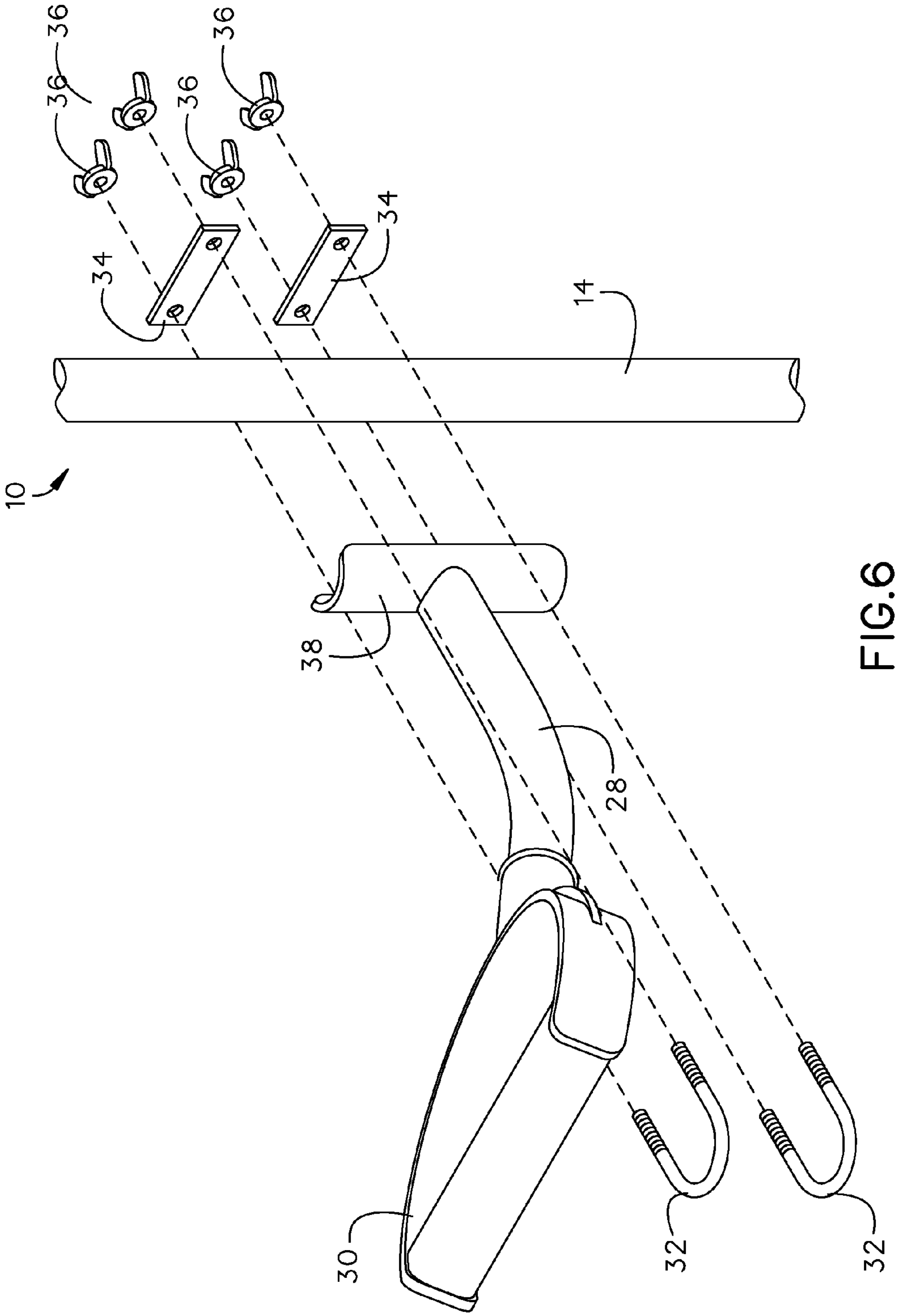
FIG. 6 is a detail exploded view of an alternate embodiment of the present invention.

The present invention may come as one piece in which the secondary shaft 16 is welded to the elongated shaft 14. However, as illustrated in FIGS. 5 and 6, the present invention may include a secondary handle attachment 24 that may be attached to an existing utility apparatus 10.

The secondary handle attachment 24 may include a secondary shaft 28 having a first end and a second end. The present invention may further include a U-bar saddle 38 having an inner surface and an outer surface. The inner surface forms a U-shaped channel formed to receive an elongated shaft 14 of the utility apparatus 10. The second end of the secondary shaft 28 is affixed to the outer surface of the U-bar saddle 38. A handle 30 is affixed to the first end of the secondary shaft 28. A bracket 26 may be used to attach the U-bar saddle 38 to the elongated shaft 14, thereby adding an additional handle 30 to the utility apparatus 10.

The bracket 26 of the present invention may include a plurality of U-bolts 32, a plurality of saddles or plates 34, and a plurality of wing nuts or standard nuts 36. The U-bolts 32 may surround the U-bar saddle 38. The saddles or plates 34 may include apertures. The ends of the U-bolts 32 may fit within the apertures on the opposite side of the elongated shaft 14. Wing nuts or other nuts 36 may be secured to the threaded ends of the U-bolts 32, thereby securing the secondary handle attachment 24 to the elongated shaft of a utility apparatus 10, such as a shovel.

In such embodiments, the secondary handle 24 may be attached so that the handle 20 is in between the first end and the second end of the elongated shaft 14. The U-bar saddle 38 and the secondary shaft 28 may be substantially perpendicular relative to one another. The secondary shaft 28 may be bent so that so that the handle 18 is at an angle from about 56 degrees to about 64 degrees relative to the U-bar saddle 38. For example, the handle 18 may be oriented at an angle of about 60 degrees relative to the U-bar saddle 38.

In certain embodiments, the elongated shaft of the present invention may be made in different lengths to accommodate different users 22. For example, the elongated straight and bent shovel shafts 14, 16 may be made shorter for people with 28-30" knuckle heights from the floor and longer for people with 33-35" knuckle heights from the floor. This way the shovel 10 is a little longer or shorter for people with shorter or longer arms. The present invention may also include a longer bent secondary shaft 16 and may be placed further down the elongated straight shaft 14 toward the shovel blade to accommodate different sized users 22.

It should be understood, of course, that the foregoing relates to exemplary embodiments of the invention and that modifications may be made without departing from the spirit and scope of the invention as set forth in the following claims.

What is claimed is:

1. A utility apparatus comprising:

an elongated shaft having a first end and a second end;

a first handle affixed to the first end of the elongated shaft;

a utility head affixed to the second end of the elongated shaft;

a secondary shaft rigidly affixed to the elongated shaft intermediate the first end and the second end of the elongated shaft, the secondary shaft including a first portion extending substantially perpendicular from the elongated shaft, a second portion extending from the first portion in a direction generally back towards the first end of the elongated shaft and away from the elongated shaft, and a distal end; and a second handle affixed to the distal end of the secondary shaft;

wherein the second handle of the secondary shaft is in fixed position relative to the first handle of the elongated shaft; and wherein the second handle is oriented at an angle from about 56 degrees to about 64 degrees relative to the elongated shaft.

2. The utility apparatus of claim 1, wherein the utility head is a shovel scoop comprising a top surface and a bottom surface.

3. The utility apparatus of claim 2, wherein the secondary shaft is protruding from the elongated shaft on a same side as the top surface of the shovel scoop.

4. The utility apparatus of claim 1, wherein the second handle is oriented at an angle of about 60 degrees relative to the elongated shaft.

5. The utility apparatus of claim 1, wherein the first handle and the second handle are each a D-grip handle.

6. A secondary handle attachment comprising:

a U-bar saddle having an inner surface defining a U-channel and an outer surface;

a secondary shaft having a first portion extending substantially perpendicularly from the U-bar saddle and a second portion extending from the first portion at an angle between approximately 26 degrees and 34 degrees and in a direction generally away from the U-bar saddle, the second portion having a distal end and a handle affixed to the distal end; and a bracket configured to secure the U-bar saddle to an elongated shaft of a utility apparatus;

wherein when the U-bar saddle is secured to the elongated shaft, the handle is oriented at an angle from about 56 degrees to about 64 degrees relative to the elongated shaft.

7. The secondary handle attachment of claim 6, wherein the bracket comprises a plurality of U-bolts, a plurality of U-bolt saddles or plates, and a plurality of wing nuts or threaded nuts.

8. The secondary handle attachment of claim 6, wherein the secondary shaft is bent so that the handle is at an angle from about 56 degrees to about 64 degrees relative to the U-bar saddle.

9. The secondary handle attachment of claim 8, wherein the handle is oriented at an angle of about 60 degrees relative to the U-bar saddle.

10. The secondary handle attachment of claim 6, wherein the second portion extends from the first portion at an angle of approximately 30 degrees.

11. The secondary handle attachment of claim 10, wherein the secondary shaft is approximately 10 inches in length.

12. A utility apparatus comprising:

an elongated shaft having a first end and a second end;

a first handle affixed to the first end of the elongated shaft;

a utility head affixed to the second end of the elongated shaft; and a secondary shaft rigidly affixed to the elongated shaft intermediate the first end and the second end, the secondary shaft including a first portion extending substantially perpendicular from the elongated shaft, a second portion extending from the first portion in a direction generally back towards the first handle and away from the elongated shaft, and oriented at an angle of approximately 30 degrees relative to the first portion, and a distal end; and a second handle affixed to the distal end of the secondary shaft;

wherein the second handle of the secondary shaft is in fixed position relative to the first handle of the elongated shaft; and wherein the second handle is oriented at an angle of approximately 60 degrees relative to the elongated shaft.

13. The utility apparatus of claim 12, wherein the secondary shaft is approximately 10 inches in length.

14. The utility apparatus of claim 12, wherein the utility head is a shovel scoop comprising a top surface and a bottom surface.

15. The utility apparatus of claim 14, wherein the secondary shaft is protruding from the elongated shaft on a same side as the top surface of the shovel scoop.

16. The utility apparatus of claim 15, wherein the first handle and the second handle are each a D-grip handle.

* * * * *